(12) United States Patent
Taylor et al.

(10) Patent No.: US 9,658,803 B1
(45) Date of Patent: May 23, 2017

(54) MANAGING ACCESSES TO STORAGE

(75) Inventors: Alan L. Taylor, Cary, NC (US);
Michael D. Haynes, Raleigh, NC (US);
Miles A. DeForest, Bahama, NC (US);
David W. Harvey, Newton Centre, MA (US);
Dennis T. Duprey, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 410 days.

(21) Appl. No.: 13/535,951

(22) Filed: Jun. 28, 2012

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC .......... *G06F 3/0689* (2013.01); *G06F 3/0604* (2013.01)

(58) Field of Classification Search
CPC ..... G06F 3/0604; G06F 3/0605; G06F 3/0689
USPC ........................................................ 711/114
See application file for complete search history.

(56) References Cited

U.S. PATENT DOCUMENTS

| 5,574,882 | A * | 11/1996 | Menon ................ G06F 11/1076 711/114 |
| 5,875,456 | A * | 2/1999 | Stallmo et al. ............... 711/114 |
| 5,884,098 | A * | 3/1999 | Mason, Jr. ...................... 710/52 |
| 7,093,038 | B2 * | 8/2006 | Ghosh et al. ................... 710/62 |
| 7,096,286 | B2 * | 8/2006 | Suzuki et al. .................. 710/74 |
| 7,302,522 | B2 * | 11/2007 | Khan et al. ..................... 711/114 |
| 7,533,205 | B2 * | 5/2009 | Lui ................................ 710/110 |
| 7,594,049 | B1 * | 9/2009 | Jain et al. ......................... 710/62 |
| 7,600,072 | B2 * | 10/2009 | Miyazaki et al. ............. 711/112 |
| 7,603,529 | B1 * | 10/2009 | MacHardy et al. ........... 711/162 |
| 7,653,831 | B2 * | 1/2010 | Okamoto et al. ............ 714/6.12 |
| 7,680,991 | B2 * | 3/2010 | Chodacki et al. ............. 711/154 |
| 8,145,941 | B2 * | 3/2012 | Jacobson ...................... 714/6.24 |
| 8,171,215 | B2 * | 5/2012 | Ikawa ................... G06F 3/0625 707/E17.01 |
| 8,838,889 | B2 * | 9/2014 | Yochai .................. G06F 3/0614 711/114 |
| 2005/0149653 | A1 * | 7/2005 | Suzuki et al. ................... 710/74 |
| 2006/0107013 | A1 * | 5/2006 | Ripberger ............. G06F 3/0605 711/170 |
| 2008/0059670 | A1 * | 3/2008 | Lui ............................... 710/110 |
| 2008/0115017 | A1 * | 5/2008 | Jacobson ....................... 714/710 |
| 2009/0228649 | A1 * | 9/2009 | Porel et al. ................... 711/114 |

(Continued)

OTHER PUBLICATIONS

HP Array Configuration Utility User Guide, HP, Jan. 2006 (First Edition), retrieved from http://www.hp.com/ctg/Manual/c00709035.pdf on Aug. 1, 2014 (71 pages).*

(Continued)

*Primary Examiner* — Daniel C Chappell
(74) *Attorney, Agent, or Firm* — Krishnendu Gupta; Jason A. Reyes

(57) ABSTRACT

A method is used in managing accesses to storage. An amount of data storage space in use by a mapped logical volume and RAID group characteristics of a storage pool used by the mapped logical volume are determined. Based on the amount and the RAID group characteristics, a report of storage resources corresponding to the mapped logical volume is produced. Based on the report, accesses to the mapped logical volume are controlled.

16 Claims, 3 Drawing Sheets

(56) References Cited

U.S. PATENT DOCUMENTS

| | | | |
|---|---|---|---|
| 2009/0276566 A1* | 11/2009 | Coatney | G06F 3/0605 711/114 |
| 2009/0327758 A1* | 12/2009 | Sakanaka et al. | 713/193 |
| 2010/0057987 A1* | 3/2010 | Liu | 711/114 |
| 2010/0235574 A1* | 9/2010 | Umezuki | G06F 11/2087 711/114 |
| 2011/0126045 A1* | 5/2011 | Bennett | 714/6.22 |
| 2011/0153917 A1* | 6/2011 | Maita et al. | 711/103 |
| 2011/0185140 A1* | 7/2011 | Arakawa | 711/165 |
| 2012/0047327 A1* | 2/2012 | Ueda | G06F 3/0613 711/114 |
| 2012/0124285 A1* | 5/2012 | Soran | G06F 3/0608 711/114 |
| 2012/0124309 A1* | 5/2012 | Watanabe et al. | 711/162 |
| 2013/0304988 A1* | 11/2013 | Totolos, Jr. | G06F 3/0613 711/114 |
| 2016/0085453 A1* | 3/2016 | Bennett | G06F 1/3203 711/103 |
| 2016/0259598 A1* | 9/2016 | Ikeuchi | G06F 3/0604 |

OTHER PUBLICATIONS

RAID 0, RAID 1, RAID 5, RAID 10 Explained with Diagrams, Ramesh Natarajan, Aug. 10, 2010, retrieved from http://www.thegeekstuff.com/2010/08/raid-levels-tutorial/ on Aug. 1, 2014 (5 pages).*

Is a confirmation screen necessary for an order form?, abeger, Feb. 5, 2010, retrieved from http://stackoverflow.com/questions/2210144/is-a-confirmation-screen-necessary-for-an-order-form on Jul. 31, 2014 (6 pages).*

The HP AutoRAID Hierarchical Storage System; Wilkes et al; ACM Transactions on Computer Systems (TOCS), vol. 14, iss. 1; Feb. 1996; pp. 108-136 (29 pages).*

Automated performance control in a virtual distributed storage system; Huang et al; 9th IEEE/ACM International Conference on Grid Computing; Sep. 29, 2008-Oct. 1, 2008; pp. 242-249 (8 pages).*

* cited by examiner

MANAGING ACCESSES TO STORAGE

BACKGROUND

Technical Field

This application relates to managing accesses to storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives (also referred to as "disks" or "drives"). Management of the resource may include allocation of a portion of the resource in response to allocation requests. In the storage array example, portions of the storage array may be allocated to, i.e., exclusively used by, entities that request such allocation.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Performance of a storage system can be characterized by the system's total capacity, response time, throughput, and/or various other metrics. The capacity of a storage system is the maximum total amount of data that can be stored on the system. The response time of a storage system is the amount of time required to read data from or write data to the storage system. The throughput of a storage system is a measure of the amount of data that can be transferred into or out of (i.e., written to or read from) the storage system over a given period of time.

The administrator of a storage array can desire to optimize the storage system in a manner that maximizes performance or balances cost vs. performance. In general, performance of a storage system can be constrained by both physical and temporal constraints. Examples of physical constraints include bus occupancy and availability, excessive disk arm movement, and uneven distribution of load across disks or across RAID groups. Examples of temporal constraints include bus bandwidth, bus speed, spindle rotational speed, serial versus parallel access to multiple read/write heads, and the size of data transfer buffers.

One factor that can limit the performance of a storage system is the performance of each individual storage device. For example, the read access time of a storage system including hard disk drives is constrained by the access time of the disk drive from which the data is being read. Read access time can be affected by physical characteristics of the disk drive, such as the number of revolutions per minute of the spindle: the faster the spin, the less time it takes for the sector being read to come around to the read/write head.

Furthermore, even if a disk-based storage system uses the fastest disks available, the performance of the storage system can be limited by the number of those disks that can be accessed at a time. In other words, performance of a storage system, whether it is an array of disks, tapes, flash drives, or other storage devices, can also be limited by system constraints, such the number of data transfer buses available in the system and the density of traffic on each bus.

SUMMARY OF THE INVENTION

A method is used in managing accesses to storage. An amount of data storage space in use by a mapped logical volume and RAID group characteristics of a storage pool used by the mapped logical volume are determined. Based on the amount and the RAID group characteristics, a report of storage resources corresponding to the mapped logical volume is produced. Based on the report, accesses to the mapped logical volume are controlled.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
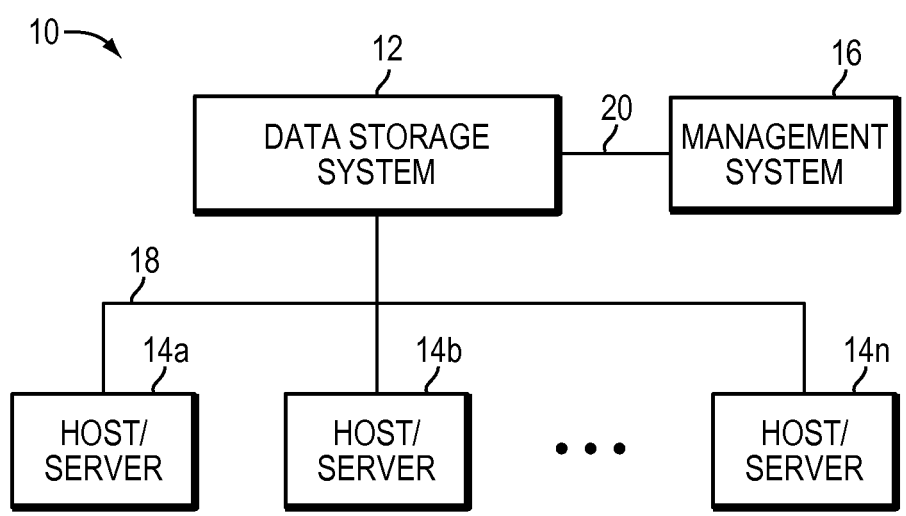
FIGS. 1-3 are block diagrams of an example of an embodiment of a computer system that may be used with the techniques described herein.

Described below is a technique for use in managing accesses to storage. In at least one implementation, the technique may be used to help provide, among other things, a method for approximating the number of data drives in a thinly provisioned logical volume (LUN).

For example, a host side (also referred to as front end) software component on a storage array may use a fairness process to limit the number of requests to a LUN based on the number of physical data drives on the back end that provide backing storage for the LUN. This fairness process helps to prevent any one host initiator from overwhelming the back end of a storage array.

For a traditional (not thinly provisioned) LUN, the fairness process can rely simply on a mapping to the underlying RAID group for the LUN, which RAID group has a static number of drives.

By contrast, in an enhancement as described herein, a mapped LUN driver (MLU) presents to a host a virtual volume such as a thinly provisioned LUN that is backed by one or more RAID groups in a storage pool. The MLU assigns storage to the virtual volume in 1 GB slices. The slices that make up the virtual volume may come from multiple RAID groups making it less straightforward to determine how many physical data drives provide the backing storage. Also, a large virtual volume may have provisioned one or more slices on all available RAID groups, which means a large number of physical data drives provide the backing storage, while a small virtual volume may have all of its slices provisioned on only a single RAID group, which means a small number of physical data drives provide the backing storage. It is impractical or difficult to determine the location of all slices, and therefore to determine exactly how many physical data drives are used for backing storage by a particular virtual volume.

In at least some implementations in accordance with the current technique as described herein, as a result of the fairness process, the MLU reports the number of data drives used as backing storage for a virtual volume with the following formula:

data drives=Min(sum of all data drives for all RAID groups in the storage pool, virtual volume size in slices)*(Default number of data drives in a RAID group in the storage pool).

In other words, the number of data drives is the smaller of:
(1) the number of drives calculated to be in the storage pool overall; or
(2) the virtual volume size in slices multiplied by the default number of drives in a RAID group in the storage pool.

Depending on the implementation, each slice may represent a fixed amount of data storage space, such as 1 GB, and/or the smallest number of drives in a RAID group in the storage pool may be used instead of the default number of drives in a RAID group in the storage pool.

In a system without the enhancement, the MLU may use a "one size fits all" approach to report the same number of data drives for every virtual volume regardless of storage pool or LUN size, and users may add more disks to a storage pool to spread the storage across as many backend drives as possible, but generally the static number can limit expected performance.

By contrast, in a system with the enhancement as described herein, use of the formula described above helps allow for large virtual volumes that may span all backend drives in a storage pool. This results in a large number of requests being allowed to be processed on that large virtual volume. At the same time a small virtual volume which cannot and does not employ as many backend drives reports a smaller number of physical data drives, thus properly limiting the number of requests received to that virtual volume.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage system 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host/server computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host/server computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host/server computer systems may perform different types of data operations in accordance with different types of tasks. In the embodiment of FIG. 1, any one of the host/server computers 14a-14n may issue a data request to the data storage systems 12 to perform a data operation. For example, an application executing on one of the host/server computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host/server computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
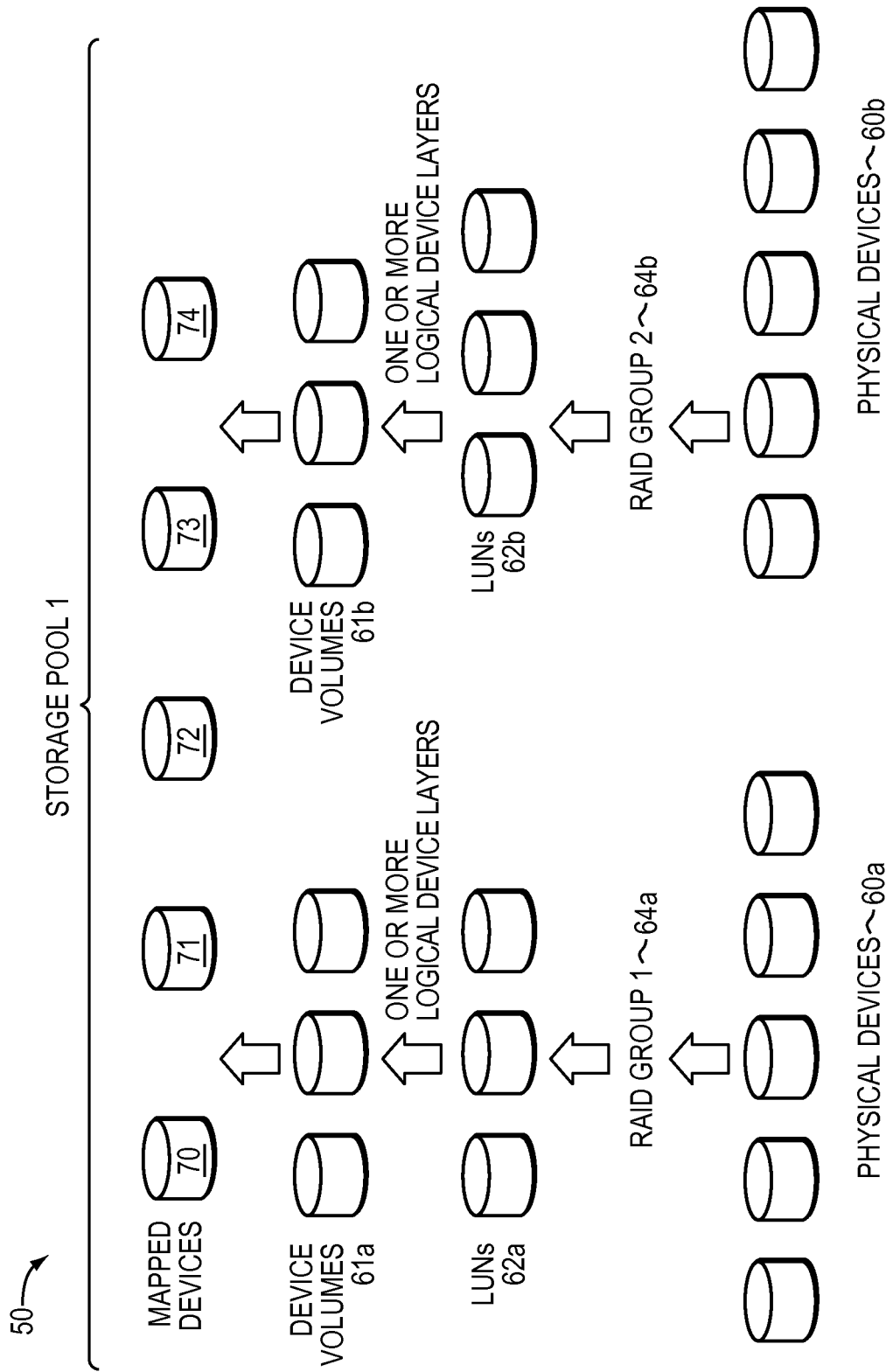

Referring to FIG. 2, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used to form a storage pool in an embodiment using RAID techniques.

The data storage system 12 may also include one or more thin devices 70-74. A thin device (also referred to as "thin logical unit" or "thin LUN") presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists, referred to as slices above, are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space. Further, a mapped LUN (e.g., mapped devices 70-74) may either be a direct mapped logical unit or thin logical unit.

Figure 3:
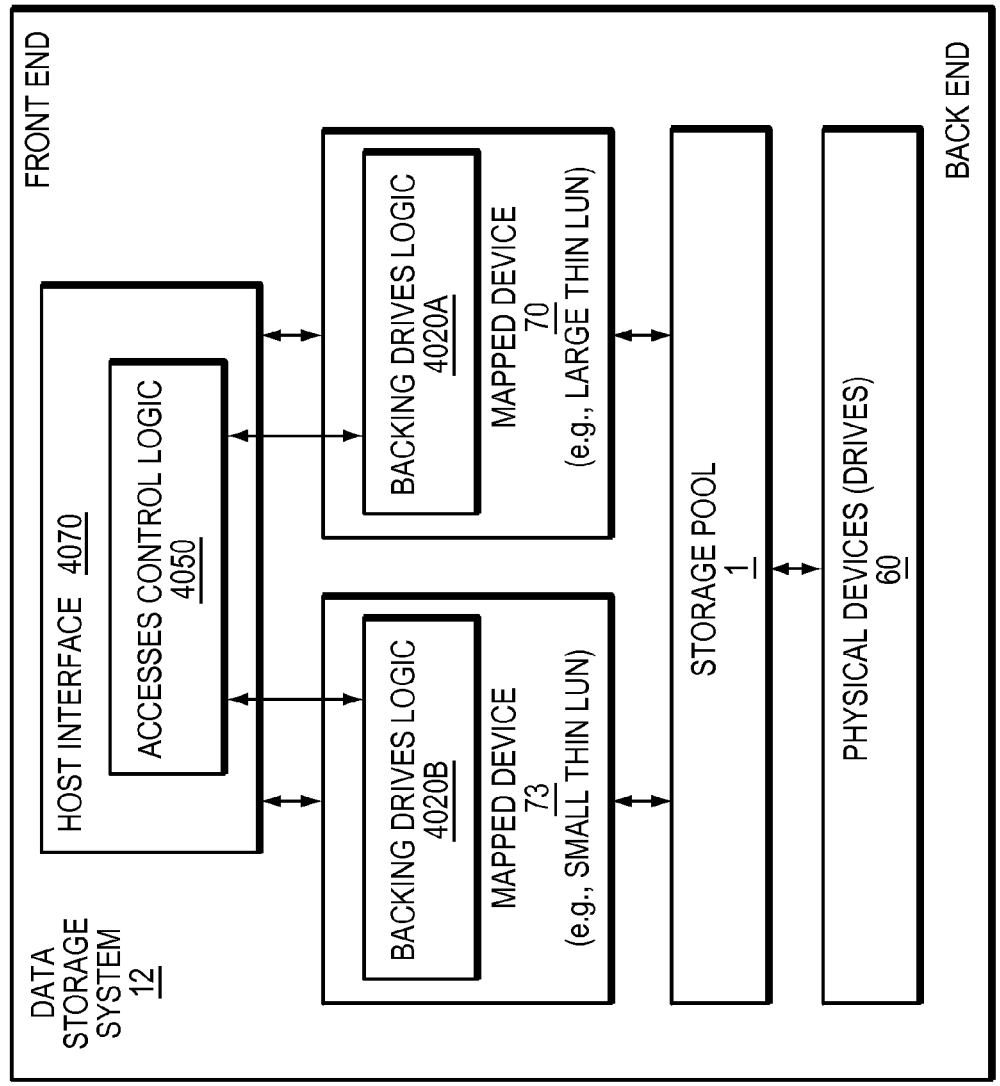

FIG. 3 illustrates an example implementation using the technique described herein. System 12 has thin LUNs 73, 70, pool 1, and, at its back end, drives 60 described above. At its front end, system 12 also has host interface 4070 for communicating with hosts 14a-14n described above.

LUNs 73, 70 have respective backing drives logic 4020B, 4020A that use the formula described above to determine how many backing disk drives to report for the LUN. Interface has accesses control logic 4050 that, based on numbers of backing disk drives for each LUN as reported by respective logic 4020B, 4020A, controls how many accesses should be allowed to flow to each of LUNs 73, 70 for processing.

For example, if pool 1 has access to X number of drives 60 in total, the highest number of backing drives that logic 4020A can report for large LUN 70 is X. In another example, by default if each RAID group in pool 1 has Y number of drives 60, the lowest number of backing drives that logic 4020B can report for small LUN 70 is Y.

In another example in which each slice is 1 GB and pool 1 has 10 RAID groups wherein each RAID group has 5 drives, if LUN 70 has a size of at least 10 GB, logic 4020A reports 50 drives, and if LUN 73 has a size of 3 GB, logic 4020A reports 15 drives.

In at least one implementation, logic 4020B, 4020A have an additional constraint or cap such that the highest number of drives that can be reported as backing storage for the LUN is Z where Z is less than the total number of backing drives available to pool 1. The constraint or cap may be used to help avoid excessive accesses from interface 4070.

As used herein, "size" of a thin LUN refers to the LUN's stated capacity.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing accesses to storage, the method comprising:
   determining an amount of data storage space in use by a mapped logical volume, wherein storage is assigned to the mapped logical volume in slices that come from at least one redundant array of independent disks (RAID) group;
   determining RAID group characteristics of a RAID group in a storage pool used by the mapped logical volume;
   based on the amount of data storage space in use by a mapped logical volume and the RAID group characteristics, determining a number of physical data drives that provide backing storage for the mapped logical volume; and
   based on the determined number of physical data drives that provide backing storage for the mapped logical volume, controlling accesses to the mapped logical volume, wherein a number of accesses to the mapped logical volume is based on the number of physical data drives that provide backing storage for the mapped logical volume;
   wherein determining the number of physical data drives that provide backing storage for the mapped logical volume comprises:
   determining a first value based on a total number of physical data drives in the storage pool, wherein the storage pool comprises a first number of physical data drives in total and the first value equates to the first number;
   determining a second value by multiplying mapped logical volume size in slices and a number of physical data drives in a particular RAID group in the storage pool, wherein the particular RAID group comprises a smallest number of physical data drives of any RAID group in the storage pool;
   determining the smaller of the first and second values;
   comparing the smaller of the first and second values to a threshold, wherein the threshold is less than the first number of physical data drives in the storage pool; and
   based on the comparison, determining the number of physical data drives that provide backing storage for the mapped logical volume;
   wherein the threshold is determined to be the number of physical data drives that provide backing storage for the mapped logical volume when the smaller of the first and second values is greater than the threshold; and
   wherein the smaller of the first and second values is determined to be the number of physical data drives that provide backing storage for the mapped logical volume when the smaller of the first and second values is less than the threshold; and
   wherein a storage system includes a fairness process for assisting in reducing the possibility of a host overwhelming the storage system with requests to the mapped logical volume by limiting the number of accesses to the mapped logical volume based on the number of physical data drives that provide backing storage for the mapped logical volume.

2. The method of claim 1, wherein the number of data drives corresponding to the mapped logical volume is approximated.

3. The method of claim 1, wherein storage is assigned to the mapped logical volume in slices that come from multiple RAID groups.

4. The method of claim 1, wherein the larger the mapped logical volume, the larger the number of accesses that are allowed to be processed on the mapped logical volume.

5. The method of claim 1, wherein accesses control logic, based on numbers of backing disk drives, controls how many accesses should be allowed to flow to the mapped logical volume for processing.

6. The method of claim 1, wherein if the storage pool has access to X number of drives in total, the highest number of backing drives that can be reported for the mapped logical volume is X.

7. The method of claim 1, wherein by default if each RAID group in the storage pool has Y number of drives, the lowest number of backing drives that can be reported for the mapped logical volume is Y.

8. The method of claim 1, wherein the highest number of drives that can be reported as backing storage for the mapped logical volume is Z where Z is less than the total number of backing drives available to the storage pool.

9. A system for use in managing accesses to storage, the system comprising:
   a processor and memory;
   the system configured to:
   determine an amount of data storage space in use by a mapped logical volume, wherein storage is assigned to the mapped logical volume in slices that come from at least one redundant array of independent disks (RAID) group;
   determine RAID group characteristics of a RAID group in a storage pool used by the mapped logical volume;
   based on the amount of data storage space in use by a mapped logical volume and the RAID group characteristics, determine a number of physical data drives that provide backing storage for the mapped logical volume; and
   control, based on the determined number of physical data drives that provide backing storage for the mapped logical volume, accesses to the mapped logical volume, wherein a number of accesses to the mapped logical volume is based on the number of physical data drives that provide backing storage for the mapped logical volume;
   wherein determining the number of physical data drives that provide backing storage for the mapped logical volume comprises:
   determining a first value based on a total number of physical data drives in the storage pool, wherein the storage pool comprises a first number of physical data drives in total and the first value equates to the first number;
   determining a second value by multiplying mapped logical volume size in slices and a number of physical data drives in a particular RAID group in the storage pool, wherein the particular RAID group comprises a smallest number of physical data drives of any RAID group in the storage pool;
   determining the smaller of the first and second values;
   comparing the smaller of the first and second values to a threshold, wherein the threshold is less than the first number of physical data drives in the storage pool; and
   based on the comparison, determining the number of physical data drives that provide backing storage for the mapped logical volume;
   wherein the threshold is determined to be the number of physical data drives that provide backing storage for the mapped logical volume when the smaller of the first and second values is greater than the threshold; and
   wherein the smaller of the first and second values is determined to be the number of physical data drives that provide backing storage for the mapped logical volume when the smaller of the first and second values is less than the threshold; and
   wherein a storage system includes a fairness process for assisting in reducing the possibility of a host overwhelming the storage system with requests to the mapped logical volume by limiting the number of accesses to the mapped logical volume based on the number of physical data drives that provide backing storage for the mapped logical volume.

10. The system of claim 9, wherein the number of data drives corresponding to the mapped logical volume is approximated.

11. The system of claim 9, wherein storage is assigned to the mapped logical volume in slices that come from multiple RAID groups.

12. The system of claim 9, wherein the larger the mapped logical volume, the larger the number of accesses that are allowed to be processed on the mapped logical volume.

13. The system of claim 9, wherein accesses control logic, based on numbers of backing disk drives, controls how many accesses should be allowed to flow to the mapped logical volume for processing.

14. The system of claim 9, wherein if the storage pool has access to X number of drives in total, the highest number of backing drives that can be reported for the mapped logical volume is X.

15. The system of claim 9, wherein by default if each RAID group in the storage pool has Y number of drives, the lowest number of backing drives that can be reported for the mapped logical volume is Y.

16. The system of claim 9, wherein the highest number of drives that can be reported as backing storage for the mapped logical volume is Z where Z is less than the total number of backing drives available to the storage pool.

* * * * *